United States Patent
Yasukochi et al.

(10) Patent No.: US 9,573,202 B2
(45) Date of Patent: Feb. 21, 2017

(54) WORKPIECE MACHINING METHOD, MACHINE TOOL, TOOL PATH-GENERATING DEVICE AND TOOL PATH-GENERATING PROGRAM

(75) Inventors: Jiro Yasukochi, Tokyo (JP); Tadashi Kasahara, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 47 days.

(21) Appl. No.: 14/389,273

(22) PCT Filed: Mar. 30, 2012

(86) PCT No.: PCT/JP2012/058658
§ 371 (c)(1),
(2), (4) Date: Sep. 29, 2014

(87) PCT Pub. No.: WO2013/145286
PCT Pub. Date: Oct. 3, 2013

(65) Prior Publication Data
US 2015/0056036 A1 Feb. 26, 2015

(51) Int. Cl.
*B23C 5/00* (2006.01)
*B23Q 15/007* (2006.01)
(Continued)

(52) U.S. Cl.
CPC .............. *B23C 5/00* (2013.01); *B23Q 15/007* (2013.01); *G05B 19/4099* (2013.01);
(Continued)

(58) Field of Classification Search
CPC ....... B23Q 15/007; B23Q 15/08; B23Q 15/22; B23Q 5/22; B23Q 2735/002; B23C 3/34; B23C 2265/12; B23C 2220/04; B23C 2220/08; B23C 2220/36; B23C 2220/52; B23C 2220/64; B23C 2220/68
(Continued)

(56) References Cited

U.S. PATENT DOCUMENTS 3,173,336 A * 3/1965 Cull .......................... B23C 3/34
409/193
2002/0049514 A1* 4/2002 Puchtler .................. B25J 9/1692
700/245
(Continued)

FOREIGN PATENT DOCUMENTS

JP 8-187643 7/1996
JP 8-292808 11/1996
(Continued)

OTHER PUBLICATIONS

JP 2007021692 A English Translation.*
(Continued)

*Primary Examiner* — Daniel Howell
*Assistant Examiner* — Yasir Diab
(74) *Attorney, Agent, or Firm* — Morrison & Foerster LLP

(57) ABSTRACT

A workpiece machining method that machines a workpiece surface by moving a rotating tool, which has a cutting blade for interrupted cutting of the workpiece surface, relative to the workpiece comprises: a first process of determining the pattern of arrangement of multiple cavities on the surface of the workpiece formed after cutting by the cutting blade; and a second process of determining the tool path of the rotating tool so that the multiple cavities are disposed on the surface of the workpiece according to the pattern of arrangement determined in the first process.

6 Claims, 12 Drawing Sheets

(51) Int. Cl.
*G05B 19/4099* (2006.01)
*B23Q 5/22* (2006.01)
*B23Q 15/22* (2006.01)
*B23Q 15/08* (2006.01)

(52) U.S. Cl.
CPC ............ *B23C 2220/48* (2013.01); *B23Q 5/22* (2013.01); *B23Q 15/08* (2013.01); *B23Q 15/22* (2013.01); *G05B 2219/35097* (2013.01); *G05B 2219/35182* (2013.01); *Y10T 409/30784* (2015.01); *Y10T 409/303752* (2015.01)

(58) Field of Classification Search
USPC .................. 409/132; 700/173, 184, 186, 182
See application file for complete search history.

(56) References Cited

U.S. PATENT DOCUMENTS

| | | | | |
|---|---|---|---|---|
| 2005/0234671 | A1* | 10/2005 | Morfino | G05B 19/4015 702/95 |
| 2006/0136088 | A1* | 6/2006 | Sato | G05B 19/19 700/159 |
| 2008/0114485 | A1* | 5/2008 | Katoh | G05B 19/404 700/193 |
| 2009/0112356 | A1* | 4/2009 | Abe | G05B 19/409 700/193 |
| 2010/0207567 | A1* | 8/2010 | Mori | B23Q 17/22 318/632 |
| 2014/0013921 | A1* | 1/2014 | Asami | B23C 3/34 83/875 |

FOREIGN PATENT DOCUMENTS

| | | |
|---|---|---|
| JP | 9-218706 | 8/1997 |
| JP | 2000-56821 | 2/2000 |
| JP | 2001-71207 | 3/2001 |
| JP | 3275599 | 4/2002 |
| JP | 2007-21692 | 2/2007 |
| JP | 2008-844 | 1/2008 |

OTHER PUBLICATIONS

JP 09218706 A English Translation.*
International Search Report mailed Jul. 10, 2012, directed to International Application No. PCT/JP2012/058658; 2 pages.

* cited by examiner

WORKPIECE MACHINING METHOD, MACHINE TOOL, TOOL PATH-GENERATING DEVICE AND TOOL PATH-GENERATING PROGRAM

CROSS REFERENCE TO RELATED APPLICATIONS

This application is a U.S. National Phase patent application of PCT/JP2012/058658, filed on Mar. 30, 2012, which is hereby incorporated by reference in the present disclosure in its entirety.

FIELD OF THE INVENTION

The present invention relates to a machining method of a workpiece and a machine tool for machining a workpiece surface by a rotary tool and to a tool path generating device and tool path generating program for generating a tool path for machining a workpiece surface.

BACKGROUND OF THE INVENTION

When using an end mill or other rotary tool to cut a workpiece surface, the workpiece surface is cut intermittently by the cutting blade. For this reason, the machined workpiece surface generally has a plurality of remaining convex uncut parts called "cusps". Between the cusps, arc shaped dimples are formed. As a machining method which considers the shape error of the workpiece surface due to such cusps, for example, the machining method which is described in the following Patent Literature 1 is known.

In the machining method which is described in Patent Literature 1, while a rotary tool is made to move along the machining points while machining the workpiece surface, the rotary tool is made to rotate by one blade's worth of rotational angle between the machining points. On the other hand, a machining method which divides a machining surface by polygonal shaped patches and machines the insides of the patches along spiral shaped tool paths to form regular surface patterns at the machined surface is also known (for example, see Patent Literature 2).

However, neither of the methods which are described in the above Patent Literatures 1 and 2 considers how the arc shaped dimples which are formed at the machined workpiece surface are arranged at the workpiece surfaces as a whole. Therefore, for example, when machining a first machining area of the workpiece surface, then machining a second machining area which adjoins this first machining area, the dimples are formed regardless of the dimples of the first machining area. As a result, incompletely shaped dimples are liable to be formed at the boundary part of the first machining area and second machining area and these incompletely shaped dimples are liable to cause streak patterns and other undesired machining marks to remain at the workpiece surface.

PATENT LITERATURE

Patent Literature 1: Japanese Patent No. 3275599B3
Patent Literature 2: Japanese Patent Publication No. 2008-844A

SUMMARY OF THE INVENTION

The present invention provides a machining method of a workpiece making a rotary tool having a cutting blade for intermittently cutting a workpiece surface move relative to the workpiece to machine the workpiece surface, which includes a first step of determining a pattern of arrangement of a plurality of dimples at the workpiece surface formed after cutting by the cutting blade and a second step of determining a tool path of the rotary tool so that the plurality of dimples are arranged at the workpiece surface in accordance with the pattern of arrangement determined at the first step.

Further, the present invention provides a tool path generating device generating a tool path for machining a workpiece surface with a rotary tool having a cutting blade for intermittently cutting the workpiece surface, which includes a dimple setting part setting a pattern of arrangement of a plurality of dimples at the workpiece surface formed after cutting by the cutting blade, and a path generating part generating a tool path of the rotary tool so that the plurality of dimples are arranged at the workpiece surface in accordance with the pattern of arrangement set at the dimple setting part.

Further, the present invention provides a machine tool machining a workpiece surface with a rotary tool having a cutting blade for intermittently cutting the workpiece surface, which includes the above tool path generating device and a machine body making the rotary tool rotate while moving the rotary tool relative to the workpiece in accordance with a tool path generated by the tool path generating device so as to machine the workpiece surface.

Still further, the present invention provides a tool path generating program making a computer generate a tool path for machining a workpiece surface with a rotary tool having a cutting blade for intermittently cutting the workpiece surface, which makes the computer run a first routine of setting a pattern of arrangement of a plurality of dimples at the workpiece surface formed after cutting by the cutting blade and a second routine of generating a tool path of the rotary tool so that the plurality of dimples are arranged at the workpiece surface in accordance with the pattern of arrangement set at the first routine.

DETAILED DESCRIPTION OF THE INVENTION

Figure 1:
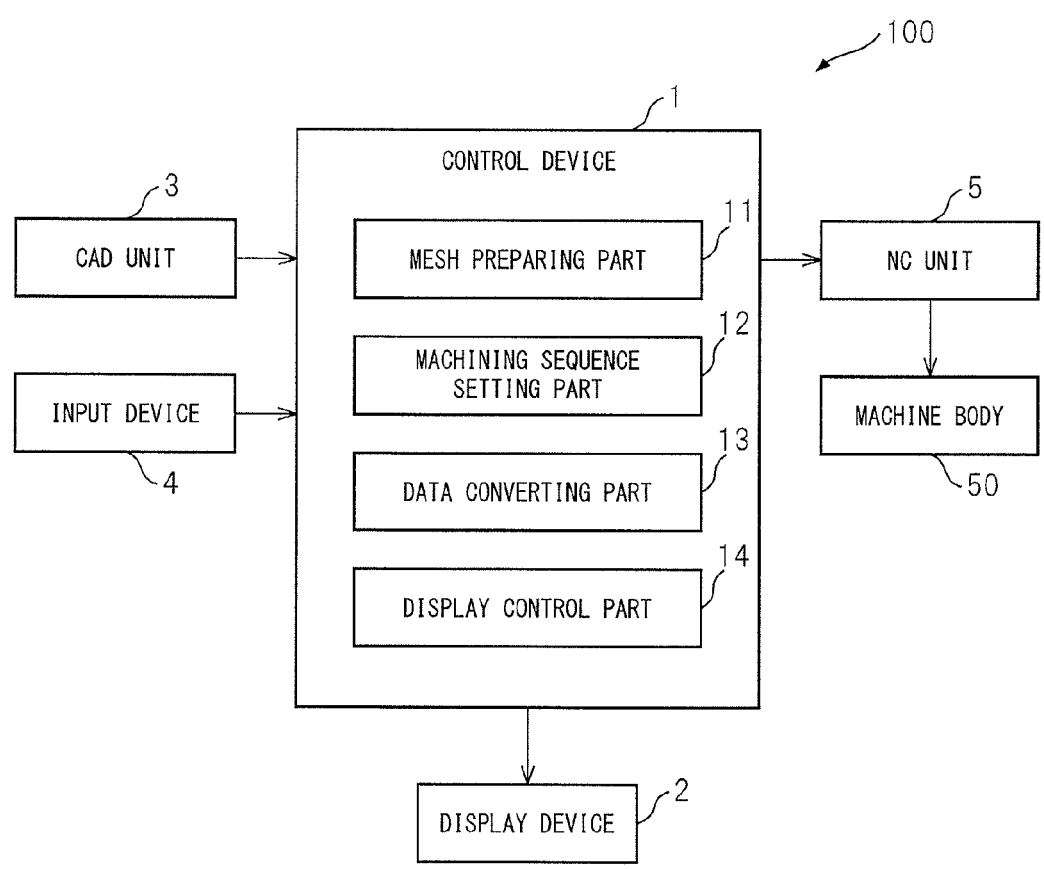
FIG. 1 is a view which shows the general configuration of a machine tool according to an embodiment of the present invention.

Below, referring to FIG. 1 to FIG. 14, an embodiment of a machine tool according to the present invention will be explained. FIG. 1 is a view which shows a general configuration of a machine tool 100 of the present invention. This machine tool 100 has a control device 1 which prepares a machining program which includes a tool path for machining a workpiece surface and machines the workpiece surface in accordance with the machining program prepared by the control device 1.

The control device 1 is a computer which is comprised of a processing system which has a CPU, ROM, RAM, and other peripheral circuits, etc. Functionally, as shown in FIG. 1, it has a mesh preparation part 11, machining sequence setting part 12, data converting part 13, and display control part 14. The control device 1 has a CAD unit (computer aided design unit) 3 and input device 4 connected to it, receives as input from the CAD unit 3 3D shape data which corresponds to the machined shape of the workpiece, and receives as input from the input device 4 various data which is required for preparing the machining program. The display control part 14 controls a display device 2.

Figure 2:
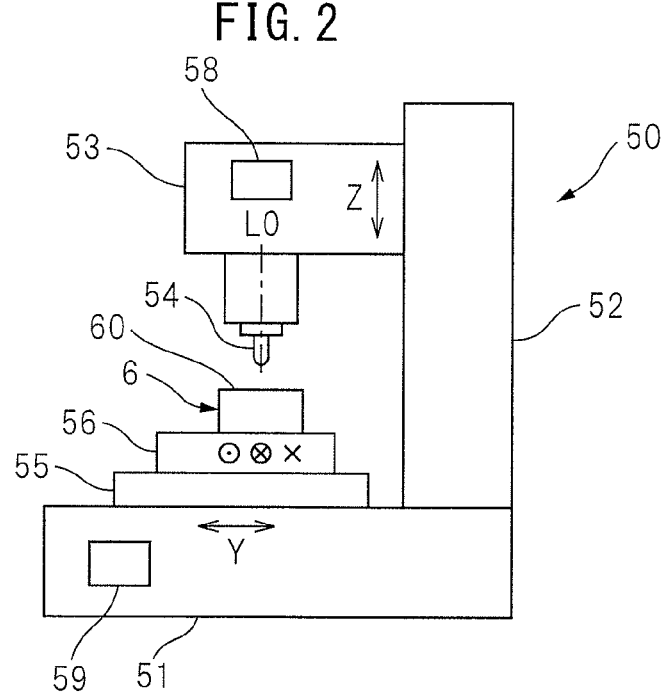
FIG. 2 is a front view which shows one example of a machine body of FIG. 1.

The machining program which is prepared by the control device 1 is output to the NC unit (numerical control unit) 5. The NC unit 5 uses this machining program as the basis to control the machine body 50 and uses the machine body 50 to machine the workpiece surface. FIG. 2 is a front view which shows one example of the machine body 50. Here, a vertical machining center is shown.

As shown in FIG. 2, a column 52 is provided on a bed 51 in a standing condition. At the column 52, a spindle head 53 is supported movably in the up-down direction (Z-axial direction) through a linear feed mechanism. A tool 54 is attached to the spindle head 53 facing downward through a spindle. The tool 54 is a rotary tool which has a cutting blade which intermittently cuts a surface 60 of a workpiece 6 and is, for example, comprised of a ball end mill. The tool 54 is driven by a spindle motor 58 in the spindle head 53 to rotate about an axial line L0 parallel to the Z-axis.

On the bed 51, a saddle 55 is supported movably in the horizontal direction (Y-axial direction) through a linear feed mechanism. On the saddle 55, a table 56 is supported movably in a horizontal direction (X-axial direction) perpendicular to the Y-axial direction. The X-axis use, Y-axis use, and Z-axis use linear feed mechanisms are, for example, comprised of ball screws and servo motors 59 which drive rotation of the ball screws. Due to this configuration, the tool 54 and the workpiece 6 move relatively in three perpendicular directions (X-, Y-, and Z-directions) whereby the workpiece 6 is machined. The X-axis use, Y-axis use, and Z-axis use servo motors 59 are actually arranged at different positions from each other, but in FIG. 2 these are shown for convenience together as a single servo motor 59. The machine body 50 may further have A-axial, B-axial, and C-axial rotation drive shafts. The workpiece 6 is, for example, a shaping die for which precision surface finishing is demanded.

Figure 3:
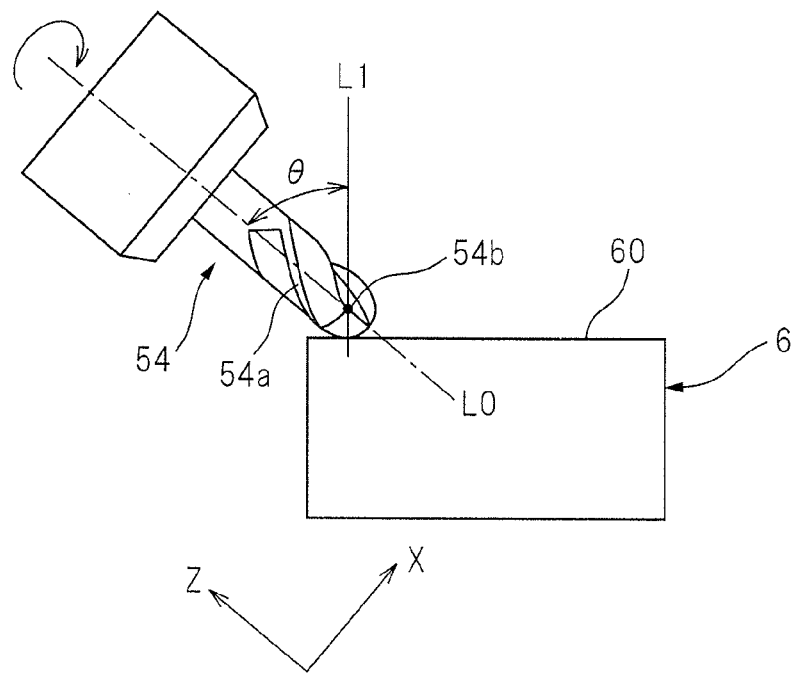
FIG. 3 is an enlarged view of a tool which is used at the machine body of FIG. 2 and which shows a state of machining of the workpiece surface.

FIG. 3 is an enlarged view of a tool 54 which shows the machining state of the workpiece surface 60. In FIG. 3, the B-axis is tilted and the axial line L0 of the tool 54 is shown tilted relative to the workpiece surface 60. The angle which is formed by the axial line L0 and the vertical line L1 of the workpiece surface 60 is made a predetermined angle θ which is larger than 0° (for example, 45°). As shown in FIG. 3, the tool 54 which is used in the present embodiment is a ball end mill which has a predetermined number of spiral shaped cutting blades 54*a* at its circumferential surface and has a front end part which exhibits an arc shape. Below, for simplification of the explanation, the tool 54 is assumed to be a single blade ball end mill which has a single cutting blade 54*a*. The shape of the front end of the tool, which is based on the center 54*b* of the ball of the front end part of the tool, is known in advance. The position of the tool 54 can be specified by the coordinates of the center 54*b*.

When making the tool 54 rotate and making it move relative to the workpiece 6 to machine the workpiece surface 60, the workpiece surface 60 is intermittently cut by the cutting blade 54*a* whereby uncut parts called "cusps" 62 (see FIG. 4B) are formed at the workpiece surface 60.

Figure 4A:
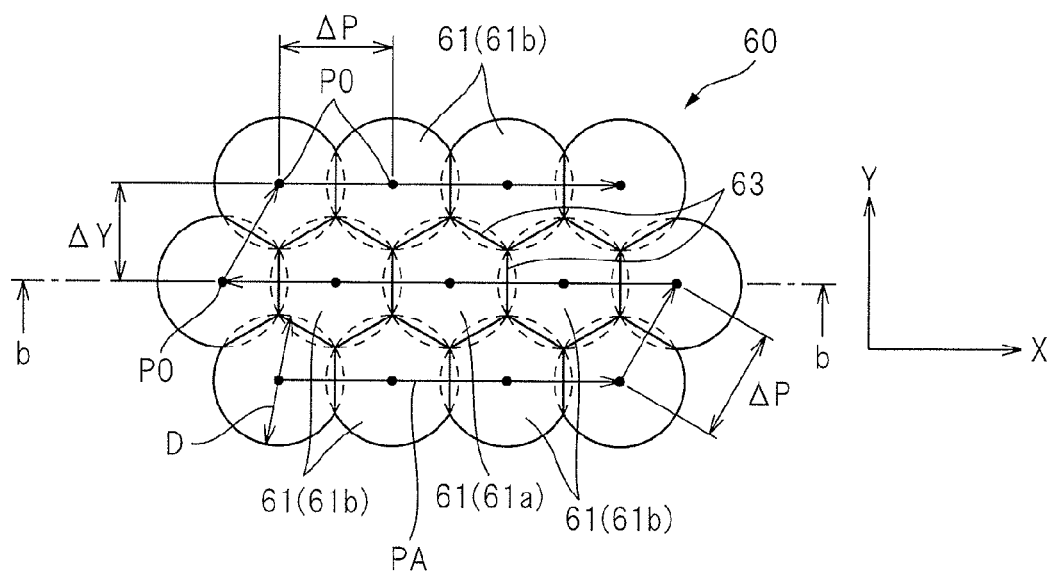
FIG. 4A is a plan view which shows one example of the shape of the workpiece surface after cutting.
Figure 4B:
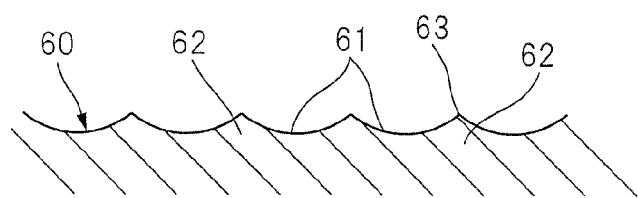
FIG. 4B is a cross-sectional view cut along the line b-b of FIG. 4A.

FIG. 4A is a plan view which shows one example of the shape of the workpiece surface after cutting, while FIG. 4B is a cross-sectional view cut along the line b-b of FIG. 4A. In FIG. 4A, the workpiece surface 60 is shown by an XY plane. By, for example, making the tool 54 move relatively on the XY plane along the machining points P0 as shown by the arrows PA, the shape of the workpiece surface shown in FIG. 4A is obtained. The machining points P0 are points which express target positions of the centers 54*b* which are reference points of the tool 54 when machining the workpiece, i.e., machining command points for generating a tool path. The arrows PA correspond to the tool path. The position data of the machining points P0 is used to form a machining program including the tool path. The machining program also includes data of the amount of tool rotation such as by how much to make the tool 54 rotate between machining points P0, P0.

The distances ΔP between the machining points P0, P0 along the arrows PA are equal to each other. Each distance ΔP corresponds to the amount of one blade of feed (also called simply "amount of feed"). A distance ΔP between the machining points P0, P0 in the Y-axial direction corresponds to an amount of pick feed. In the present embodiment, a single blade ball end mill is used, so the tool 54 rotates one revolution during moving from one machining point P0 to the next machining point P0. By making the tool 54 rotate while making it move relatively along the tool path PA, the workpiece surface 60 is cut by the cutting blade 54*a* whereby the workpiece surface 60 is formed with spherical surface shaped dimples 61 corresponding to the tool shape.

The amount of feed ΔP of FIG. 4A is smaller than the diameter D of the dimples 61. The dimples 61 partially overlap. As a result, as shown in FIG. 4B, between one adjoining dimple 61 and another dimple 61, a convex shape uncut part, i.e., a cusp 62, is formed. In FIG. 4A, if expressing one dimple 61 and its surrounding dimples 61 by respectively 61*a* and 61*b*, six dimples 61*b* are formed evenly around one dimple 61*a* so as to partially overlap with the dimple 61a. At the boundary parts of the dimple 61a and the dimples 61b, straight intersection lines 63 are formed. Therefore, the shapes of the machined dimples become hexagonal shapes (solid lines) in the plan view surrounded by six intersection lines 63.

Figure 5:
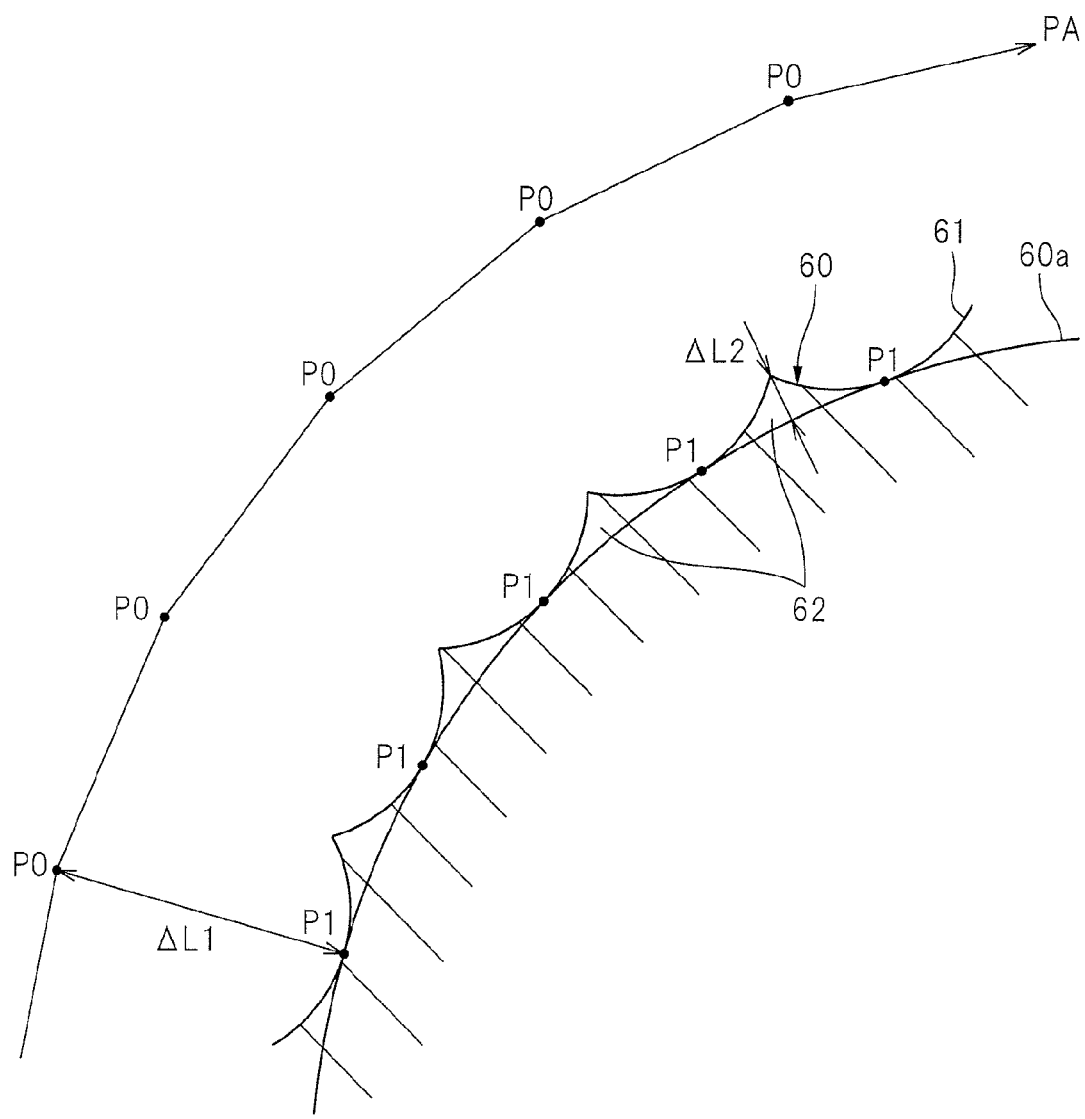
FIG. 5 is a view which shows the positional relationship between the dimples which are formed at the workpiece surface and machining points.

FIG. 5 is a view which shows the positional relationship between the dimples 61 which are formed at the workpiece surface 60 and the machining points P0. In FIG. 5, the center point of a spherical shaped dimple 61 (i.e., median point of adjoining cusps 62, 62) is designated as P1, while the design-stage workpiece surface ignoring the formation of the cusps 62 is designated as 60a. As shown in FIG. 5, the center points P1 of the dimples 61 are positioned on the workpiece surface 60a, while the machining points P0 are set at positions separated from the center points P1 by predetermined distances ΔL1. Therefore, the tool path PA which connects the machining points P0 is formed separated from the workpiece surface 60a by the predetermined distance ΔL1. Here, ΔL1 is the distance from the center 54b of the tool 54 shown in FIG. 3 to the outer circumferential surface of the cutting blade 54a of the front end part of the tool, i.e., corresponds to the radius of the ball at the front end part of the tool. The maximum distance between the design-stage workpiece surface 60a and the actual workpiece surface 60 corresponds to the cusp height ΔL2.

As shown in FIG. 4A, if setting the machining points P0 uniformly above the workpiece surface 60 (strictly speaking, the design-stage workpiece surface 60a) to generate the tool path PA and making the tool 54 rotate by one blade's worth of angle between the machining points, it is possible to uniformly arrange a plurality of dimples 61 at the workpiece surface 60. However, when a machining area include a plurality of mutually adjoining machining areas (first machining area and second machining area), the tool path is formed independently at each machining area, so incompletely shaped dimples are liable to be formed at the boundary part of the first machining area and the second machining area. This problem will be explained with reference to FIG. 6.

Figure 6:
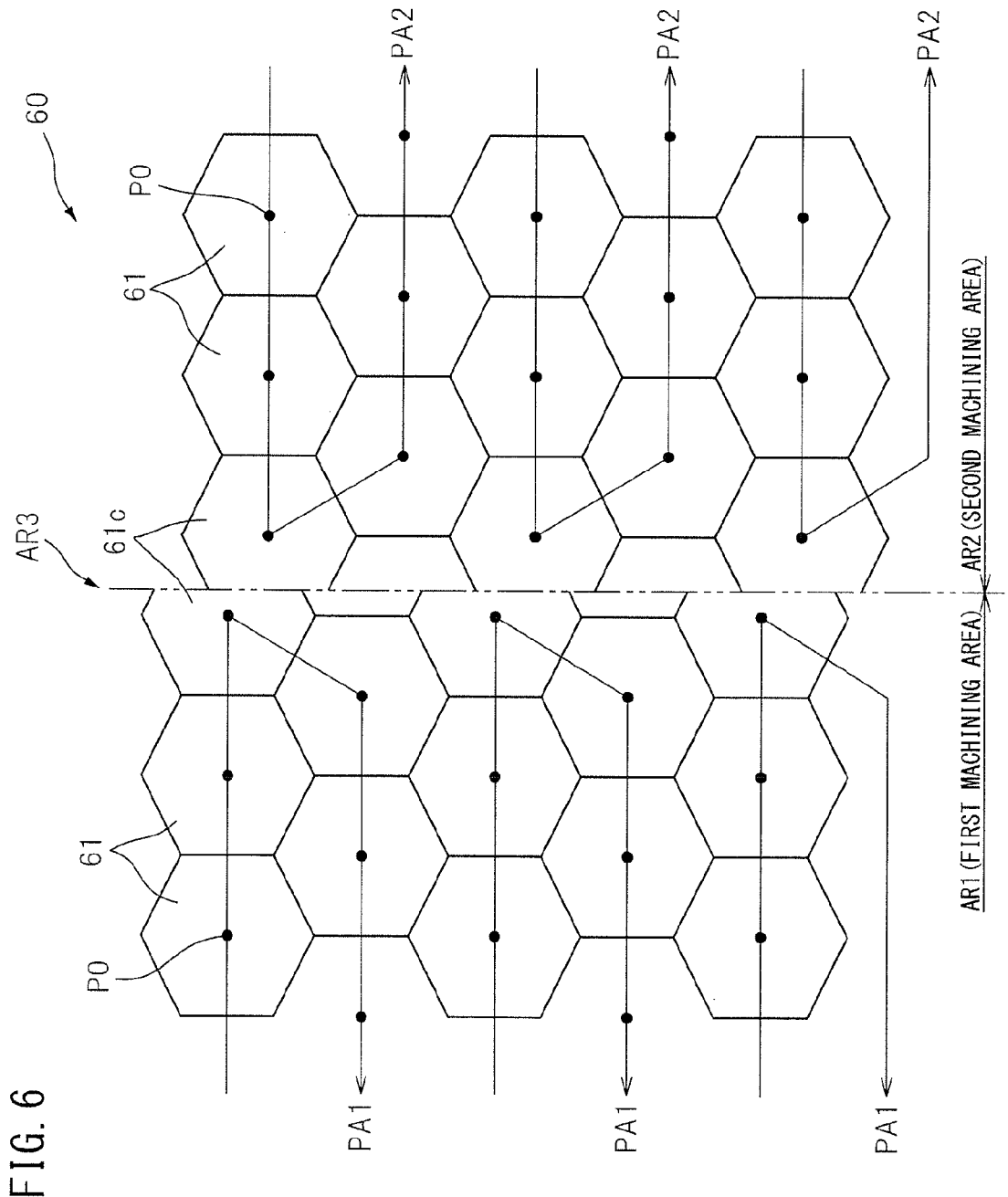
FIG. 6 is a plan view of the workpiece surface which includes a first machining area and a second machining area and explains the problem to be solved by the workpiece surface machining system of the present embodiment.

FIG. 6 is a plan view of a workpiece surface W1 which includes a first machining area AR1 and a second machining area AR2. The "machining area" is an area which is machined along a predetermined tool path, i.e., an area with a constant machining pattern. In other words, the tool path is set for each machining area. The tool paths at the different machining areas are discontinuous. As shown in FIG. 6, in the first machining area AR1 and second machining area AR2, like in FIG. 4A, the pluralities of machining points P0 are evenly set.

Assuming that the first machining area AR1 is machined along the tool path PA1, then the second machining area is machined along the tool path PA2 which is independent from the tool path PA1. In this case, the positions of the dimples 61 in the first machining area AR1 have no relation with the positions of the dimples 61 in the second machining area AR2. For this reason, at the boundary part AR3 of the first machining area AR1 and the second machining area AR2, incompletely shaped dimples 61c are formed. Due to these incompletely shaped dimples 61c, streak patterns and other machining marks are liable to be left at the workpiece surface. Such machining marks are not particularly preferable for a workpiece 6 where machining quality of the surface (for example, a die) is demanded. Therefore, in the present embodiment, the control device 1 is configured in the following way so that the workpiece surface 60 is not formed with streak patterns or other machining marks.

The mesh preparation part 11 of FIG. 1 receives as input signals from the input device 4. The input device 4 is configured by a keyboard, touch panel, etc. The shape, dimensions, etc. of the dimples which are formed on the workpiece surface 60 can be input.

Figure 7:
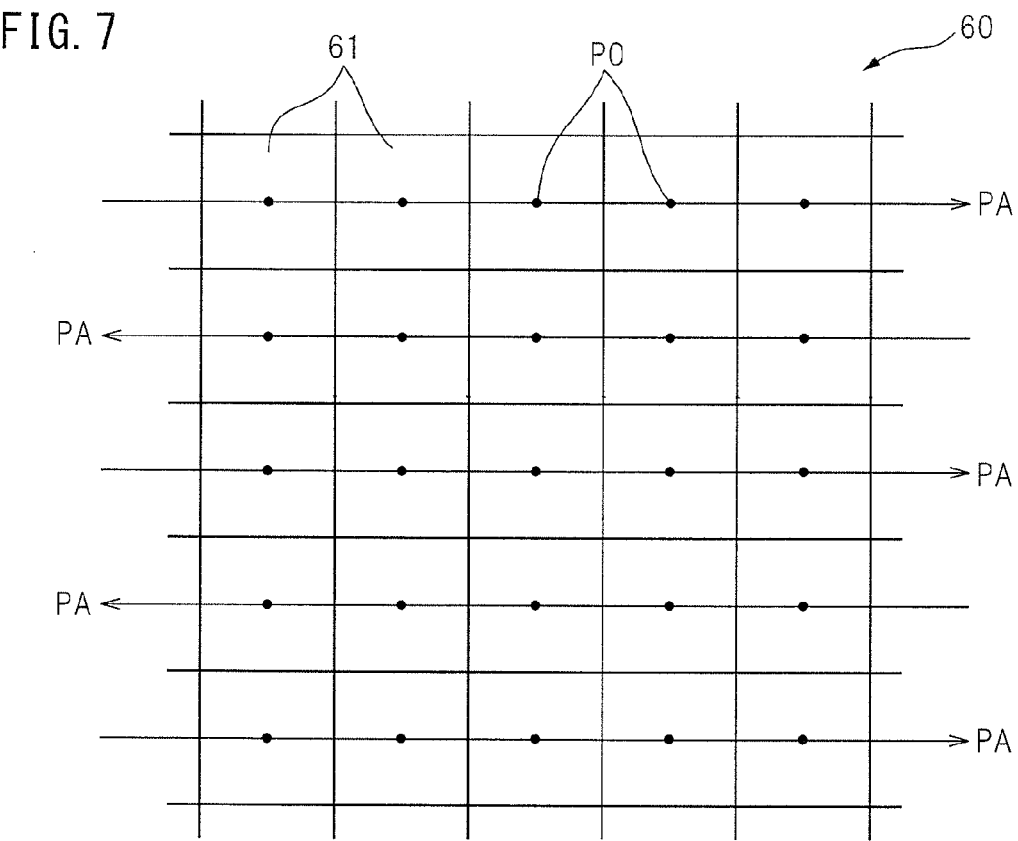
FIG. 7 is a plan view of the workpiece surface where the shapes of the dimples are rectangular shapes.

As the shape of the dimples, in addition to the hexagonal shape of FIG. 6, a triangular shape, rectangular shape, pentagonal shape, or various other shapes can be input. FIG. 7 shows an example where the shape of the dimples is a rectangular one (in particular, a square one). FIG. 7 shows together an example of the machining points P0 corresponding to the center positions of the dimples 61 and tool path PA.

The dimension of the dimples 61, for example, corresponds to the distance ΔP between center points (machining points P0) of the dimples 61 of FIG. 4A. This value can also be input by the user. The type of the tool 54, number of cutting blades 54a, dimensions of the front end part of the tool 54, feed rate of the tool 54, and other information are also input from the input device 4.

The mesh preparation part 11 uses the signals from the CAD unit 3 and input device 4 as the basis to prepare a mesh along the shape of the workpiece surface. That is, the mesh preparation part 11 obtains shape data of the design-stage workpiece surface 60a from the CAD unit 3 and obtains the shape and dimensions of the dimples 61 from the input device 4. Further, based on these input data, the mesh preparation part 11 automatically divides the workpiece surface 60a to prepare a mesh. Below, the dimples which are prepared by the mesh preparation part 11, i.e., the virtual dimples which are formed on the design-stage workpiece surface 60a, will be represented by 610 and differentiated from the dimples 61 which are formed after machining. The starting point of preparation of the mesh, the pattern of preparation of the mesh, and other conditions of mesh preparation can also be input in advance by the user.

Figure 8:
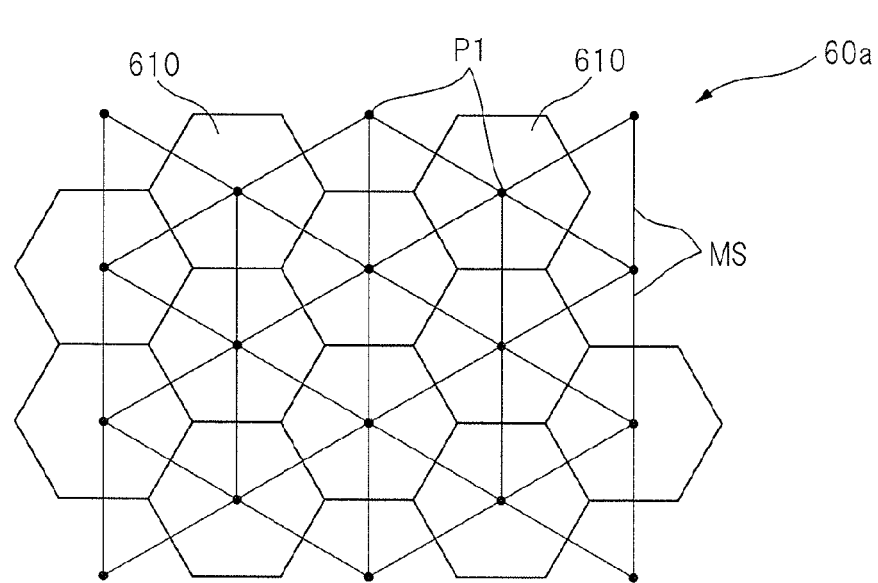
FIG. 8 is a view which shows one example of a mesh which is prepared by the mesh preparation part of FIG. 1.

There are various methods for automatic preparation of a mesh. Giving one example, Delaunay triangulation is known. FIG. 8 is a view which shows one example of a mesh MS of a workpiece surface 60a prepared by the mesh preparation part 11. In this example, the input device 4 is used to command an hexagonal shape as the shape of the dimples. Delaunay triangulation is used to prepare a mesh of equilateral triangles. The vertices of the mesh MS correspond to the center points P1 of the virtual dimples 610, while the distances between center points P1, P1 correspond to the sizes of the virtual dimples 610. Due to this, the mesh preparation part 11 can prepare virtual dimples 610 of the shape and dimensions which are input by the input device 4. The virtual dimples 610 obtained by mesh division are uniformly set at the workpiece surface as a whole regardless of being the same machining area or not.

Figure 9:
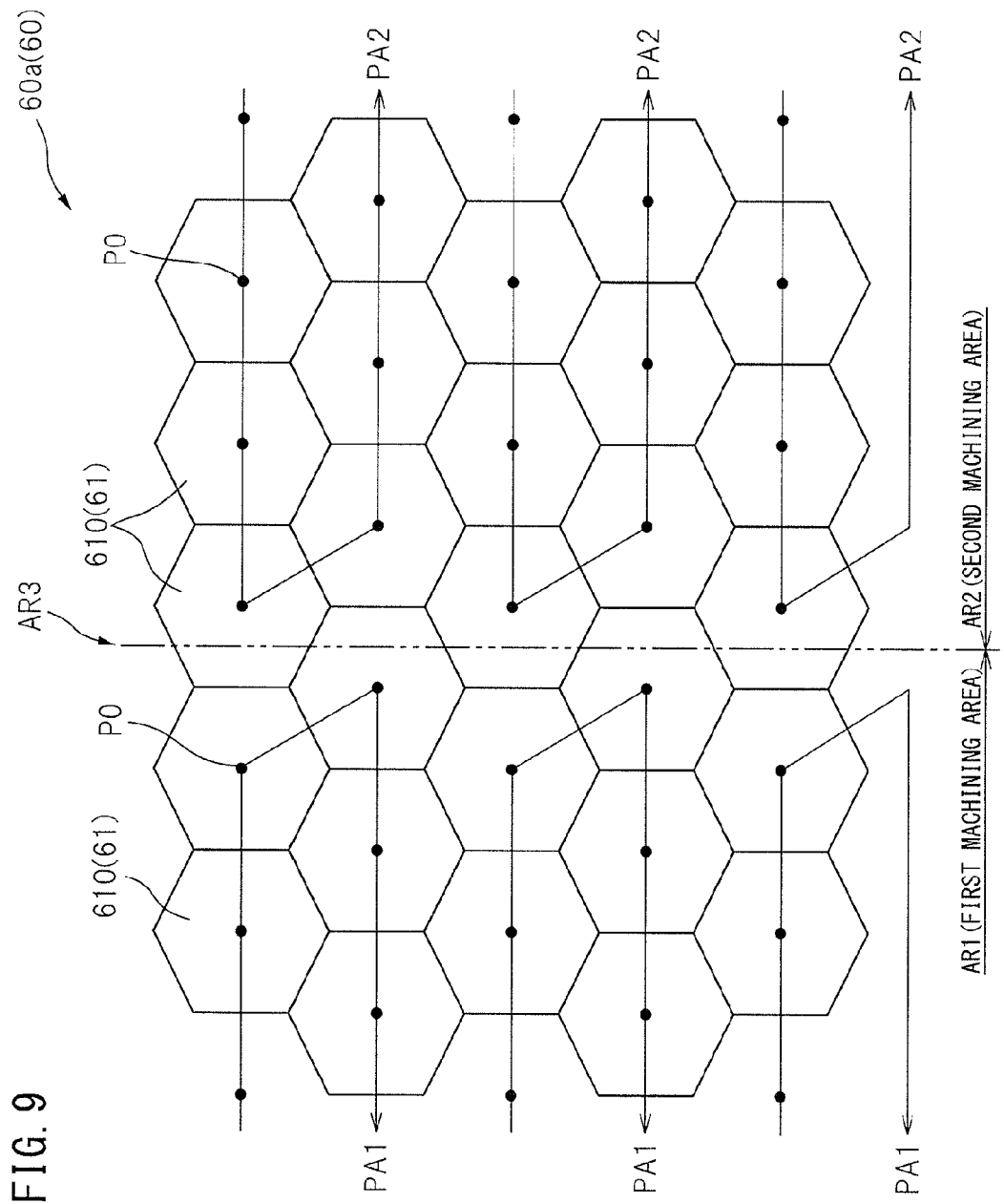
FIG. 9 is a view which shows one example of a pattern of arrangement of dimples at the workpiece surface which is formed by the machine tool of FIG. 1.

FIG. 9 is a view which shows an example of a pattern of arrangement of virtual dimples 610 of a workpiece surface 60a which includes different machining areas AR1 and AR2. The figure shows together the machining points P0 and the tool paths PA1, PA2. Although FIG. 9 shows the pattern of arrangement of virtual dimples 610 before machining the workpiece, the pattern of arrangement of dimples 61 after machining the workpiece is also the same as FIG. 9, as explained later. As shown in FIG. 9, at the workpiece surface 60a, virtual dimples 610 are uniformly arranged from the first machining area AR1 to the second machining area AR2. Therefore, at the boundary part AR3 of the first machining area AR1 and the second machining area AR2, incompletely shaped dimples 61c such as shown in FIG. 6 are not formed.

The mesh preparation part 11 divides the design-stage workpiece surface 60*a* into a mesh and uniformly arranges virtual dimples 610 over the entire workpiece surface, then sets machining points P0 at positions separated from the center points P1 of the virtual dimples 610 by a predetermined distance ΔL1 (FIG. 5).

The machining sequence setting part 12 successively connects the machining points P0 set by the mesh preparation part 11 to set the machining sequence. The machining points P0 are connected by, for example, displaying an image of the virtual dimples 610 prepared by the mesh preparation part 11 (dimple image) on a display device 2 and having the user use the input device 4 (for example, mouse) to successively select virtual dimples 610 on the dimple screen.

Figure 10:
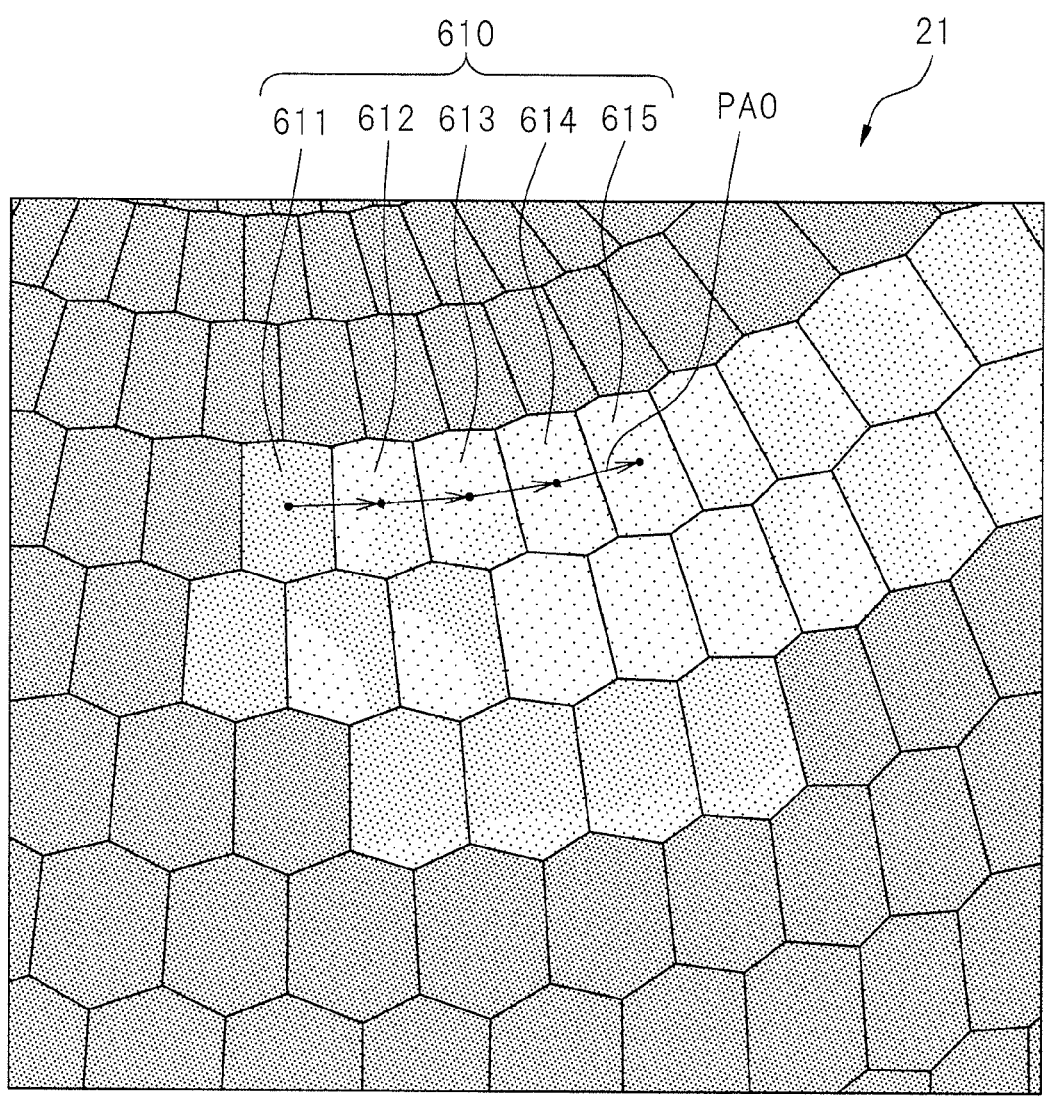
FIG. 10 is a view which shows one example of a dimple image which is displayed at a display device of FIG. 1.

FIG. 10 is a view which shows one example of the dimple image 21 displayed on the display device 2. The image signal for displaying this dimple image 21 is generated at the display control part 14 based on the signal from the mesh preparation part 11. The display control part 14 controls the display device 2 in accordance with the generated image signal. In the example of FIG. 10, to express the workpiece surface 60*a* three-dimensionally, the dimple image 21 is displayed in gradations to give shading to the image 21. In FIG. 10, the virtual dimples 610*b* are displayed as hexagonal shapes. However, the shape of the virtual dimples 610 may change in accordance with the shape of the machined surface of the workpiece 6, the shape of the mesh MS, etc., and is not limited to a hexagonal shape.

If the dimple image 21 such as shown in FIG. 10 is displayed on the display device 2, the user successively selects part of the virtual dimples 610 (for example, 611 to 615) on the image 21 through the input device 4. Due to this, as shown by the arrows of FIG. 10, a machining sequence PA0 which successively connects the machining points P0 corresponding to the virtual dimples 611 to 615 is set. The machining sequence setting part 12 sets the data of the machining points P0 sequenced in this way (coordinate data) as the machining sequence data.

Rather than the user inputting the machining sequence manually, it is also possible to follow a predetermined rule to automatically set it by the machining sequence setting part 12. For example, as shown by the tool paths PA1 and PA2 of FIG. 9, by repeating successively connecting machining points P0 included in the machining areas AR1 and AR2 along one direction from one end part to the other end part, then shifting by the amount of pick feed and successively connecting machining points in the opposite direction, it is also possible to automatically set the machining sequence.

When the set of the machining sequence finishes, the data converting part 13 converts the machining sequence data to NC data which can be read into the NC unit (numerical control unit) 5 and prepares a machining program. The machining program contains coordinate data of the machining points P0 which are sequenced in accordance with the machining sequence PA0 and amounts of rotation (phase of rotation) of the tool 54 between the machining points P0, P0. This machining program is used to define the tool path PA.

Figure 11:
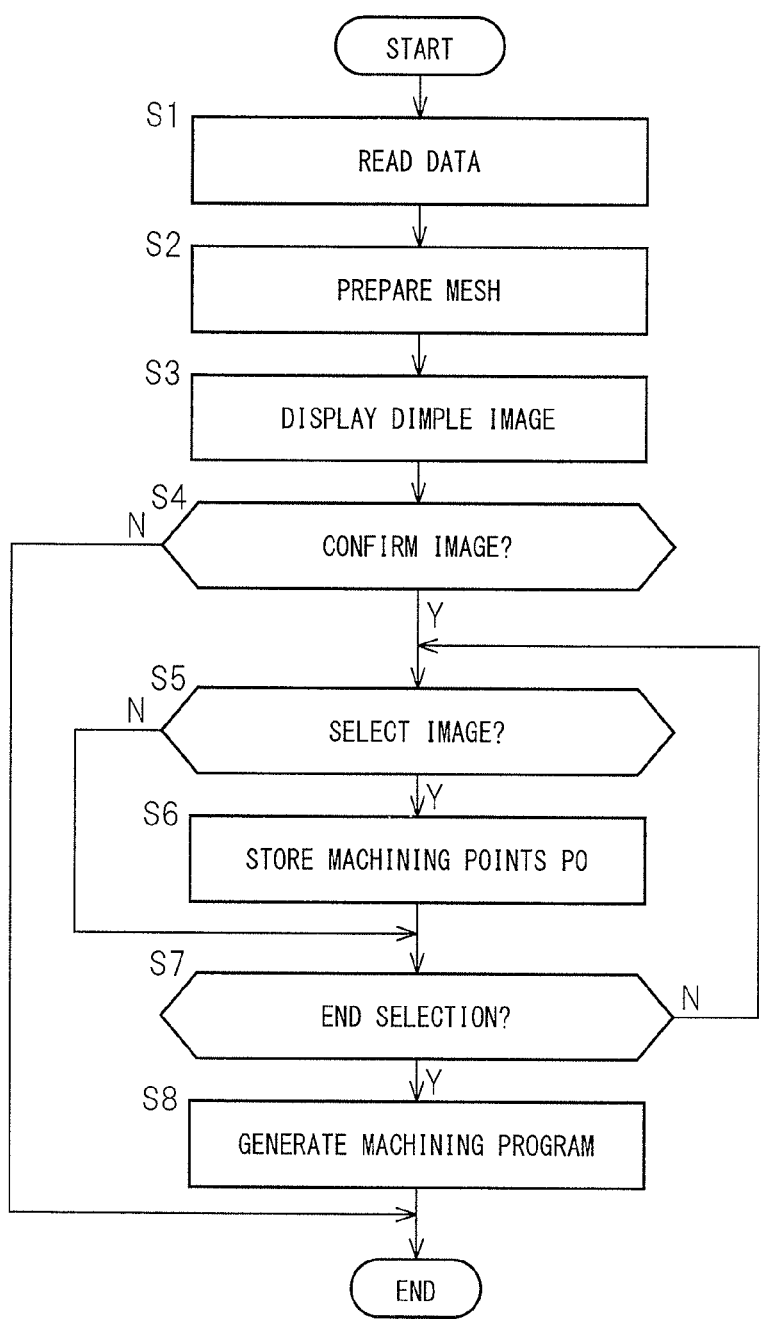
FIG. 11 is a flow chart which shows one example of the processing which is executed by the control device of FIG. 1.

The above processing can be realized by making the CPU of the control device 1 run a tool path generating program which is stored in advance in the control device 1. FIG. 11 is a flow chart which shows one example of the processing which is performed at the control device 1 (tool path generating processing). The processing shown in this flow chart is, for example, started by the user operating the input device 4 to input a machining program preparation command. Before input of the machining program preparation command, the mesh preparation conditions which define the shape, dimensions, etc. of the dimples 61 and the shape, dimensions, and other tool data of the tool 54 are input from the input device 4 and stored in the memory.

At step S1, the CAD data is read from the CAD unit 3, and the mesh preparation conditions and other various data input in advance is read. At step S2, a mesh MS is prepared along the workpiece surface 60*a* which is defined by the CAD data in accordance with the mesh preparation conditions, as shown in FIG. 8.

At step S3, the display control part 14 generates an image signal for displaying the vertices of the mesh MS as centers of the virtual dimples 610, and displays the dimple image 21 on the display device 2, as shown in FIG. 10. At step S4, it is judged whether to confirm the dimple image 21. This processing judges whether to redo the mesh preparation. For example, the user views the display of the dimple image 21 and judges if the dimples 61 which are to be formed on the workpiece surface 60 are the ones intended. Further, if judging that they are the ones intended, the input device 4 is operated to command confirmation of the dimple image 21. Due to this, a positive decision is made at step S4 and the routine proceeds to step S5.

On the other hand, if the user judges that the dimple image 21 has been intended, the input device 4 is operated to command cancellation of the dimple image 21. Due to this, a negative decision is made at step S4 and the tool path generating routine of FIG. 11 is ended. In this case, the user changes the mesh preparation conditions, etc., then the above-mentioned processing is redone.

At step S5, it is judged if the input device 4 (for example, a mouse) has been operated to select a virtual dimple 610 inside the dimple image 21. If a positive decision is made at step S5, the routine proceeds to step S6, while if a negative decision is made, the routine proceeds to step S7. At step S6, the coordinates of the machining points P0 which correspond to the selected virtual dimples 610 are calculated and stored in the memory. At this time, for example, the machining points P0 are stored in the selected sequence so that the machining points P0 are sequenced.

Next, at step S7, it is judged if all of the virtual dimples 610 on the dimple image 21 have finished being selected. This judgment is performed, for example, by judging whether a selection end command has been input by the input device 4. If changing the mode of display of the selected virtual dimples 610 (for example, color), a user can easily judge whether virtual dimples 610 have been selected or not selected. If a negative decision is made at step S7, the routine returns to step S5 where similar processing is repeated. Due to this, the machining sequence data which includes the coordinate data of the machining points P0 and the sequence of the machining points P0, i.e., the machining sequence data which shows the machining sequence PA0 which is shown by the arrows of FIG. 10, is set.

If a positive decision is made at step S7, the routine proceeds to step S8. At step S8, data of the amount of target rotation of the tool 54 between the machining points is added to the machining sequence data, and the machining sequence data is converted to NC data which can be read into the NC unit 5. That is, the machining sequence data is used as the basis to prepare a machining program which includes the tool path PA. Due to this, the processing at the control device 1 is ended.

The NC unit 5 includes a reading part which reads a machining program (NC data), an acceleration control part which controls acceleration and deceleration of motors 58 and 59 of the machine tool 50, and an interpolation processing part which calculates the target amounts of movement in the X-axial direction, Y-axial direction, and Z-axial direction and target amount of rotation of the spindle. Further, it controls the machine tool 50 in accordance with the machining program from the control device 1. In this case, it controls the motors 58 and 59 so that the tool 54 moves relative to the workpiece 6 along the tool path PA included in the machining program while the cutting blade 54*a* rotates by one blade's worth of angle between the machining points P0. Due to this, for example, the tool 54 moves while rotating along the tool path for each machining area PA1 and PA2 of FIG. 9.

As a result, as shown in FIG. 9, the workpiece surface 60 is formed with dimples 61 of the same pattern of arrangement as predetermined virtual dimples 610. Therefore, regardless of whether the machining area is the same, the workpiece surface 60 can be uniformly formed with dimples 61. That is, it is possible to prevent the formation of streak patterns or other machining marks without the formation of incompletely shaped dimples at the boundary part AR3 of the first machining area AR1 and the second machining area AR2.

Summarizing the machining method of a workpiece surface according to the above present embodiment, the result becomes as follows: First, through the input device 4, the user sets the shape and dimensions of the dimples 61 to be formed at the workpiece surface 60. After that, if the user inputs a machining program preparation command through the input device 4, the above processing is started at the control device 1 and the mesh MS is automatically prepared in accordance with the mesh preparation conditions (step S2). Further, the dimple image 21 is displayed so that the vertices of the meshes MS become the centers of the virtual dimples 610 (step S3).

The user views this dimple image 21 and judges whether the dimples 61 which are formed at the workpiece surface 60 are the intended ones and, in accordance with need, redoes the mesh preparation. When not redoing the mesh preparation, it instructs confirmation of the dimple image 21, and operates the input device 4 to successively select virtual dimples 610 on the image. Due to this, the machining sequence data which shows the machining sequence PA0 which successively connects the machining points P0 is set (step S6). If finishing selecting all of the virtual dimples 610, the user inputs a selection end command through the input device 4. Due to this, the machining sequence data is converted to NC data which can be read into the NC unit 5, and a machining program is prepared (step S8). This machining program includes sequence and position data of the machining points P0 and data of the target amount of rotation of the tool 54 between the machining points P0, P0.

The NC unit 5 controls the motors 58 and 59 of the machine body 50 in accordance with the machining program from the control device 1 to make the center 54*b* of the tool 54 move along the machining points P0 and to make the tool 54 rotate by the target amount of rotation between the machining points. Due to this, the workpiece surface 60 is machined and the machined workpiece surface 60 is formed with dimples 61 of the same pattern of arrangement as the virtual dimples 610 of the dimple image 21. In this case, the workpiece surface 60 is machined for each machining area, while the machined workpiece surface 60 is formed with dimples 61 which are evenly arranged regardless of the machining area. Therefore, it is possible to prevent the formation of streak patterns and other machining marks without the formation of incompletely shaped dimples at the boundary parts AR3 of different machining areas AR1 and AR2.

According to the present embodiment, the following actions and effects can be exhibited.

(1) The pattern of arrangement of a plurality of dimples 61 on the workpiece surface which is formed after cutting by the cutting blade 54*a* of the tool 54 in advance (virtual dimples 610) is determined and a tool path PA is set so that a plurality of dimples 610 are arranged on the workpiece surface 60 in accordance with that pattern of arrangement. That is, by processing in the machining data preparation part 1, the design-stage workpiece surface 60*a* is divided into a mesh to set virtual dimples 610, machining points P0 corresponding to the virtual dimples 610 are calculated, and these machining points P0 are successively connected to set a tool path PA. Due to this, it is possible to uniformly form dimples 61 at the workpiece surface 60 without incompletely shaped dimples being arranged at the boundary part AR3 of different machining areas AR1 and AR2 (FIG. 9).

(2) The design-stage workpiece surface 60*a* is divided into a mesh in accordance with the mesh preparation conditions input by the input device 4 so as to determine the shape, size, and arrangement of the virtual dimples 610. That is, the pattern of arrangement of virtual dimples 610 is determined in advance and the workpiece surface 60 is machined in accordance with a machining program so that dimples 61 are formed by the same pattern as that pattern of arrangement. Due to this, the workpiece surface 60 can be formed with the desired dimples 61.

(3) Not only the tool path PA obtained by successively connecting machining points P0, but also the amount of rotation of the tool 54 between machining points is set. The tool path and the amount of rotation of the tool are included in the machining program. Due to this, it is possible to form dimples 61 which correspond to the machining points P0 at all times without regard as to the feed speed of the tool 54, the surface shape of the workpiece 6, etc.

(4) The motors 58 and 59 are controlled so that the tool 54 rotates by one blade's worth of angle between the machining points in accordance with a predetermined machining program. Therefore, it is possible to obtain the desired dimples 61 even when the distance between the machining points differ.

(5) The display control part 14 generates an image signal which makes the vertices of the mesh MS prepared by the mesh preparation part 11 the centers of the virtual dimples 610, and displays an image as a dimple image 21 in advance on the display device 2 before machining the workpiece. Due to this, a user can obtain a grasp in advance of the pattern of arrangement of dimples 61 which are to be formed on the workpiece surface 60 and can prevent mistaken conditions to be used to machine the workpiece 6.

Figure 12:
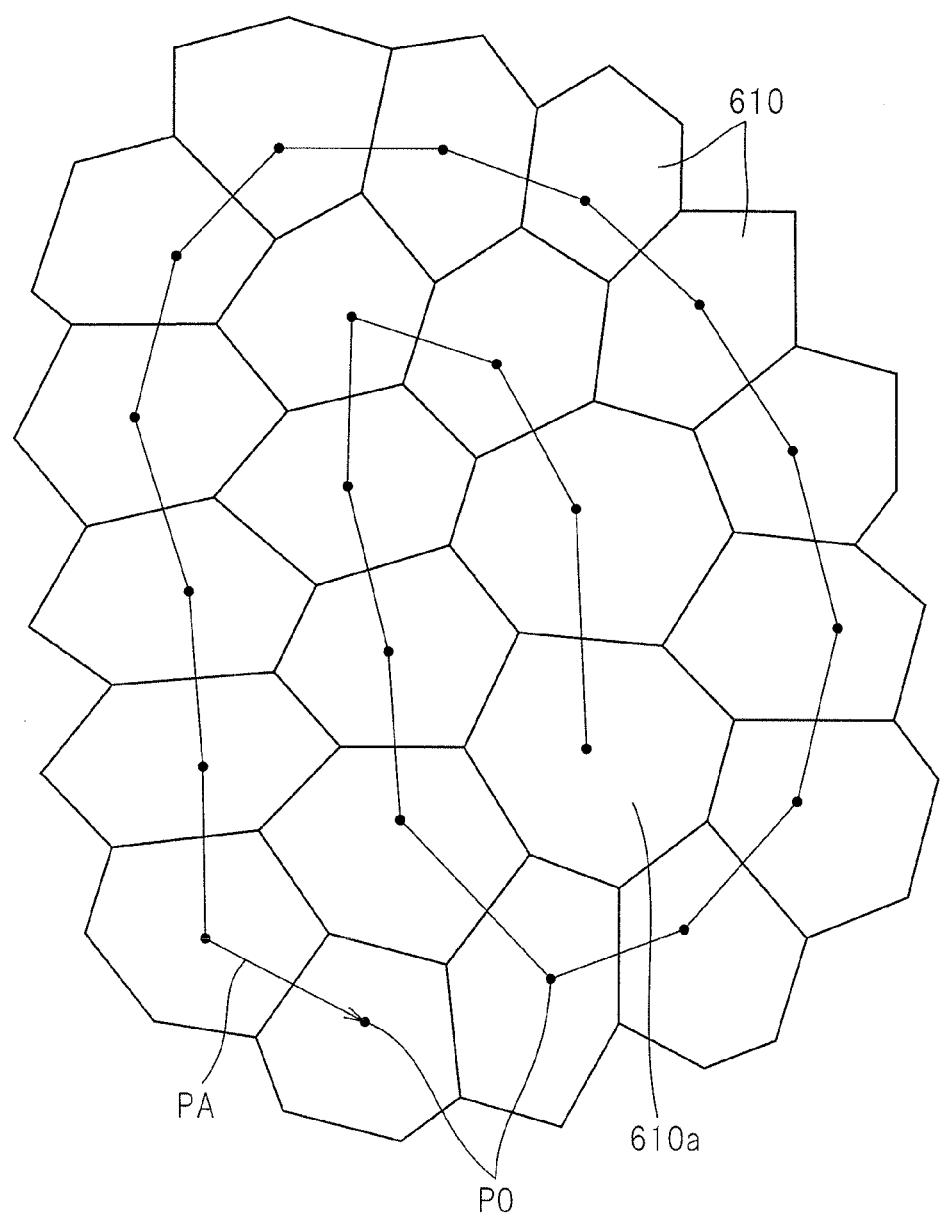
FIG. 12 is a view which shows a modification of FIG. 9.
Figure 13:
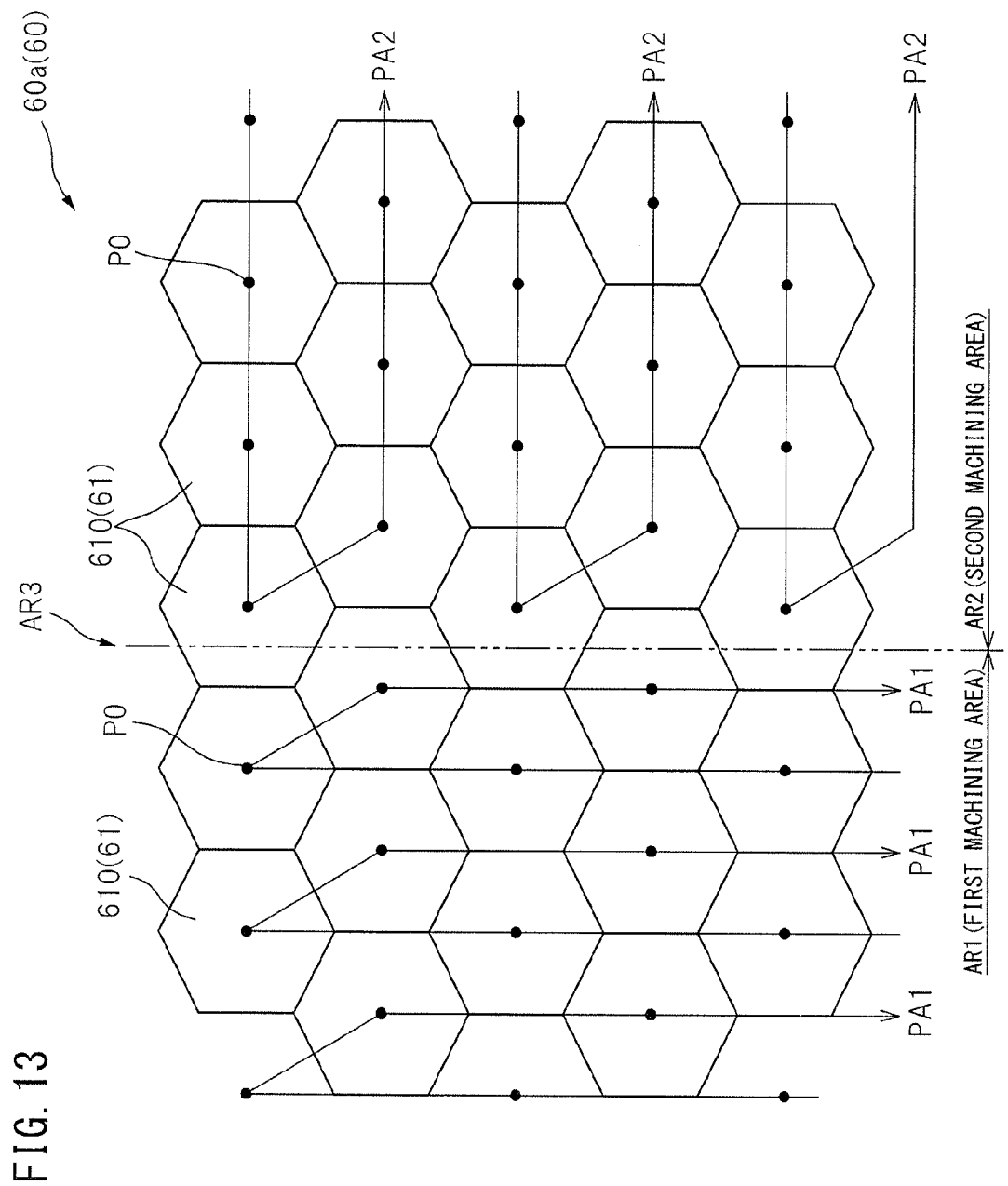
FIG. 13 is a view which shows another modification of FIG. 9.

The pattern of arrangement of virtual dimples 610 which are formed on the workpiece surface 60*a* and tool path PA are not limited to the ones explained above. FIGS. 12 and 13 are views which show other examples of the pattern of arrangement of virtual dimples 610 and tool path PA. As shown in FIG. 12, it is also possible to set a virtual dimple 610*a* as a reference and set the tool path PA in a spiral shape centered about this virtual dimple 611. Further, as shown in FIG. 13, the tool path PA1 in the first machining area AR1 and the tool path PA2 in the second machining area AR2 may be set to different directions.

Figure 14:
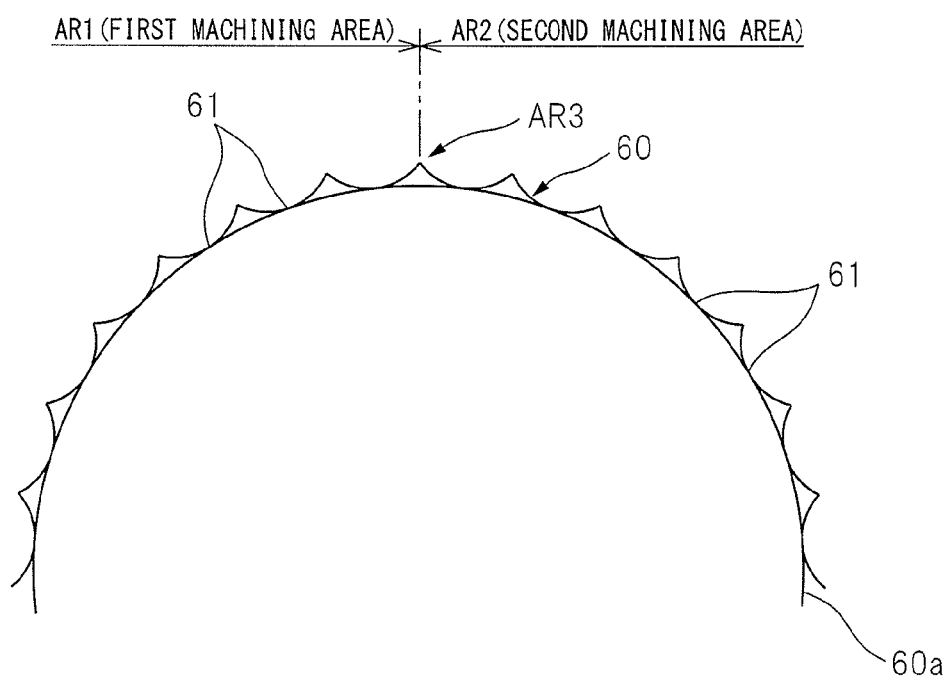
FIG. 14 is an example when making the workpiece surface which is machined by the machine tool of the present embodiment a curved shape.

The present invention can be applied to various shapes of workpieces and can also be applied to settings of various machining areas AR. For example, as shown in FIG. 14, it can also be applied to the case where the workpiece surface 60 is a curved surface in shape and a first machining area AR1 and second machining area AR2 are set bordered on the vertex of the curved surface. In this case as well, it is possible to form the workpiece surface as a whole smooth without leaving machining marks at the boundary part AR3 of the first machining area AR1 and the second machining area AR2. The present invention can be applied to part of the machined surface of the workpiece rather than the entire region. For example, it is also possible to determine the patterns of arrangement of the virtual dimples 610 in advance at the locations where quality finish of the surface is demanded and near the boundary parts of the plurality of machining areas and generate the tool path PA in accordance with that pattern of arrangement.

In the above embodiment, the shapes and dimensions of the dimples 61 are designated in advance by the user. The mesh preparation part 11 is used to prepare the mesh MS and automatically set the virtual dimples 610 to meet the designated conditions. The virtual dimples 610 may also be set by manual input by the user. Rather than have the shape and dimensions of the virtual dimples 610 determined by the user, it is also possible to automatically determine them by the control device 1 in accordance with the shape, etc., of the workpiece. That is, if determining the pattern of arrangement of dimples 610 of the workpiece surface 60a in advance, the first step may be any step. The dimple setting part (mesh preparation part 11) is not limited in configuration to the one explained above.

As a second step, the tool path PA is determined through the dimple image 21 of the display device 2, but if determining the pattern of arrangement of the virtual dimples 610, then determining the tool path PA along the pattern of arrangement, the second step may be any step. It is also possible to automatically set efficient tool paths PA corresponding to the shapes of the workpieces, etc., by the control device 1. The path generating parts (machining sequence setting part 12 and data converting part 13) are not limited in configurations to the ones which are explained above. That is, the constitution of the control device 1 as a tool path generating device constituted is not limited in configuration to the one explained above.

In the above embodiment, the rotary tool 54 is made to rotate by one blade's worth of angle between the machining points, but this may also be realized by making the rotational speed of the tool 54 constant and controlling the feed speed by variable control or by making the feed speed of the tool 54 constant and controlling the rotational speed by variable control. This may also be realized by controlling both the feed speed and rotational speed of the tool 54 by variable control. That is, as the third step, when controlling the motors 58 and 59 of a machine tool, it is sufficient to control at least one of the motors 58 and 59 by variable control.

In the above embodiment (FIG. 9), the pattern of arrangement of virtual dimples 610 is determined in a machining area including the first machining area AR1 which is machined by the first machining pattern and the second machining area AR2 which is machined by the second machining pattern. However, the present invention can be similarly applied even in the case of including three or more different machining areas. Further, even in a single machining area AR, when the phases of adjoining dimples at a tool path before pick and feed of a tool 54 and a tool path after pick and feed are not uniform and is irregular deviation in the tool advancing direction, streak patterns are liable to be generated at the machined workpiece surface. In this case as well, the present invention can be similarly applied.

So long as making a first routine which sets a pattern of arrangement of virtual dimples 610 of the workpiece surface 60a and a second routine which generates a tool path PA so that a plurality of dimples 61 are arranged at the workpiece surface 60 in accordance with this set pattern of arrangement be run by a computer constituted by the control device 1, the tool path generating program is not limited in configuration to the one explained above. Therefore, the processing in the control device 1 is also not limited to the one which is shown in FIG. 11. The tool path generating program can be stored in the control device 1 through various storage media or communication lines, etc.

In the above embodiment, as the rotary tool 54, a ball end mill is used. However, so long as a tool which has a cutting blade which intermittently cuts the workpiece surface, the present invention can be applied even when using a radius end mill or using another rotary tool.

In the above embodiment, a three-axis machining use vertical machining center is used to form the machine body 50. However, so long as able to make a tool 54 move relative to a workpiece 6 in accordance with a tool path PA which is generated by a control device 1 and to machine a workpiece surface 60, it is possible to use another machine body. For example, the tool path generating device according to the present invention can be applied to various machine bodies such as a horizontal machining center, five-axis machining use machining center or machine body other than a machining center.

According to the present invention, a pattern of arrangement of a plurality of dimples at a workpiece surface is determined in advance and the tool path of the rotary tool is determined so that dimples are arranged in accordance with the determined pattern of arrangement. Therefore, streak patterns or other undesired machining marks can be prevented from remaining at the workpiece surface.

REFERENCE SIGNS LIST 1 control device
2 display device
3 CAD unit
4 input device
11 mesh preparation part
12 machining sequence setting part
13 data converting part
14 display control part
21 dimple image
50 machine body
54 tool
54a cutting blade
60 workpiece surface
61 dimple
610 virtual dimple
PA tool path

The invention claimed is:

1. A method of generating a tool path for machining a surface of a workpiece by moving a rotary tool relative to the workpiece, the rotary tool having a cutting blade adapted to cut a workpiece surface intermittently, the method comprising the steps of:
dividing a design-stage workpiece surface of the workpiece into a mesh, based on shape data on the design-stage workpiece surface and a shape of dimples to be formed by the cutting blade, the mesh comprising vertices and lines connecting the vertices;
setting a pattern of arrangement of a plurality of virtual dimples on the design-stage workpiece surface, so that the virtual dimples have corresponding vertices as center points thereof and a size determined by a length of a corresponding line connecting two neighboring vertices;

setting a sequence for machining the virtual dimples; and determining a tool path of the rotary tool based on the sequence for machining the virtual dimples.

2. The method according to claim 1, wherein the virtual dimples are set on design-stage workpiece surface after the shape and size of the virtual dimples are determined.

3. The method according to claim 1, wherein a plurality of machining points corresponding to the plurality of virtual dimples are connected to determine the tool path.

4. The method according to claim 1, wherein the virtual dimples are uniformly set on the design-stage workpiece surface from a first machining area, where the workpiece is to be machined by a first machining pattern, to an adjoining second machining area where the workpiece is to be machined by a second machining pattern.

5. A tool path generating device for generating a tool path for machining a workpiece surface by moving a rotary tool relative to the workpiece, the rotary tool having a cutting blade for intermittently cutting the workpiece surface, comprising:

a mesh preparation part dividing a design-stage workpiece surface of the workpiece into a mesh, based on shape data on the design-stage workpiece surface and a shape of dimples to be formed by the cutting blade, the mesh comprising vertices and lines connecting the vertices;

a dimple setting part setting a pattern of arrangement of a plurality of virtual dimples on the design-stage workpiece surface, so that the virtual dimples have corresponding vertices as center points thereof and a size determined by a length of a corresponding line connecting two neighboring vertices; and a path generating part setting a sequence for machining the virtual dimples and generating a tool path of the rotary tool based on the sequence for machining the virtual dimples.

6. A non-transitory storing medium storing thereon a computer program for generating a tool path for machining a surface of a workpiece by moving a rotary tool along the tool path relative to the workpiece, the rotary tool having a cutting blade adapted to cut a workpiece surface intermittently, the computer program causing a computer to carry out the steps of:

dividing a design-stage workpiece surface of the workpiece into a mesh, based on shape data on the design-stage workpiece surface and a shape of dimples to be formed by the cutting blade, the mesh comprising vertices and lines connecting the vertices;

setting a pattern of arrangement of a plurality of virtual dimples on the design-stage workpiece surface, so that the virtual dimples have corresponding vertices as center points thereof and a size determined by a length of a corresponding line connecting two neighboring vertices;

setting a sequence for machining the virtual dimples; and determining a tool path of the rotary tool based on the sequence for machining the virtual dimples.

* * * * *